United States Patent
Kosaki et al.

(10) Patent No.: US 10,700,320 B2
(45) Date of Patent: Jun. 30, 2020

(54) BATTERY MODULE

(71) Applicant: Yazaki Corporation, Tokyo (JP)

(72) Inventors: Akihiro Kosaki, Toyota (JP); Yoshiaki Ichikawa, Kakegawa (JP); Makoto Kobayashi, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/394,681

(22) Filed: Apr. 25, 2019

(65) Prior Publication Data

US 2019/0363322 A1    Nov. 28, 2019

(30) Foreign Application Priority Data

May 25, 2018    (JP) .................. 2018-100435

(51) Int. Cl.
| | |
|---|---|
| *B60K 1/04* | (2019.01) |
| *B60R 16/04* | (2006.01) |
| *H01M 2/10* | (2006.01) |
| *H01M 2/04* | (2006.01) |
| *H01M 2/20* | (2006.01) |
| *H02G 3/16* | (2006.01) |
| *H02J 7/00* | (2006.01) |
| *B60R 11/00* | (2006.01) |

(52) U.S. Cl.
CPC ............ *H01M 2/1083* (2013.01); *B60K 1/04* (2013.01); *B60R 16/04* (2013.01); *H01M 2/04* (2013.01); *H01M 2/202* (2013.01); *H02G 3/16* (2013.01); *H02J 7/00* (2013.01); *B60K 2001/0438* (2013.01); *B60R 2011/0029* (2013.01); *H01M 2220/20* (2013.01)

(58) Field of Classification Search
CPC .. B60K 1/04; B60K 2001/0438; B60R 16/04; B60R 2011/0029; H01M 2/04; H01M 2/202; H01M 2220/20; H02G 3/16; H02G 3/08; H02J 7/00
USPC ........................................................ 180/68.5
See application file for complete search history.

(56) References Cited

U.S. PATENT DOCUMENTS

| | | | |
|---|---|---|---|
| 5,643,693 A | 7/1997 | Hill et al. | |
| 7,484,581 B2 * | 2/2009 | Yamafuji | ............. B60L 3/0007 180/220 |
| 8,662,225 B2 * | 3/2014 | Masfarud | ................ B60L 58/22 180/68.5 |
| 9,485,881 B2 * | 11/2016 | Nagamori | ................ H05K 5/03 |
| 2016/0197320 A1 | 7/2016 | Mack et al. | |
| 2019/0337374 A1 * | 11/2019 | Yokoyama | ........... B60K 5/1208 |

FOREIGN PATENT DOCUMENTS

| | | |
|---|---|---|
| JP | 11-299115 A | 10/1999 |
| WO | 2014/107094 A1 | 7/2014 |

* cited by examiner

*Primary Examiner* — John D Walters
(74) *Attorney, Agent, or Firm* — Sughrue Mion, PLLC (57) ABSTRACT

A battery module that can improve efficiency of operation in maintenance is provided. A battery module includes a battery and a power distribution unit configured to distribute power to a load, wherein the power distribution unit includes a base and a device mounting portion supported by the base and electrically connected to the base to distribute power from the battery to the load, and the base includes a battery connection portion for connection with the battery, and a load connection portion for connection with the load.

14 Claims, 5 Drawing Sheets

BATTERY MODULE

TECHNICAL FIELD

The present invention relates to a battery module.

BACKGROUND

A vehicle battery box mounted on a vehicle and configured to supply power to each load has been disclosed (for example, refer to Patent Document 1 listed below). A vehicle battery box disclosed in Patent Document 1 includes a battery box and an electric component body housed in a recessed portion formed on the battery box. The battery box includes a built-in battery and is attached to a panel within an engine compartment of the vehicle. The electric component body is a fusible link box having a plurality of fusible links and is electrically connected between each load and the battery, and power is supplied from the battery to each load via this electric component body.

PRIOR ART DOCUMENT

Patent Document

Patent Document 1: JPH 11-299115 A

SUMMARY OF THE INVENTION

In the conventional vehicle battery box, for example during vehicle inspection, the electric component body would need to be removed for repair or exchange (hereinafter referred to as maintenance). However, during that time, connector connection between the electric component body and each load and the battery needs to be disconnected, and thus if the connection location is located at a place difficult of access, then operation efficiency is lowered.

In view of the above-described problem, an object of the present invention is to provide a battery module which can improve efficiency of operation in the maintenance.

In order to achieve the above-described object, a first aspect of the present invention provides a battery module including a battery and a power distribution unit connected to the battery and configured to distribute power to a load, wherein the power distribution unit includes a base and a device mounting portion supported by the base and electrically connected to the base to distribute power from the battery to the load, and the base includes a battery connection portion for connection with the battery, and a load connection portion for connection with the load.

A second aspect of the present invention provides the battery module according to the first aspect, wherein the base includes an installation portion on which the device mounting portion is installed, the device mounting portion is provided with a connector connection portion to which a conductive member extending from the base is connected, and the connector connection portion is provided at a front side of the device mounting portion that is located away from the installation portion.

A third aspect of the present invention provides the battery module according to the first aspect, further including a pair of connection portions configured to connect via connector connection the base with the device mounting portion, wherein the base includes an installation portion on which the device mounting portion is installed, the installation portion includes one of the pair of the connection portions, and another one of the pair of the connection portions is provided to the device mounting portion and positioned so as to be fitted to the one of the pair of connection portions when the device mounting portion is installed to the installation portion.

A fourth aspect of the present invention provides the battery module according to any one of the first to third aspect, wherein the base includes an installation portion on which the device mounting portion is installed, and the battery connection portion and the load connection portion are provided at a back side distant from the device mounting portion across the installation portion.

A fifth aspect of the present invention provides the battery module according to any one of the first to fourth aspects, further including a case housing the battery and the power distribution unit, wherein the case includes an opening configured to allow the device mounting to be exposed, and a cover covering the opening.

A sixth aspect of the present invention provides the battery module according to the fifth aspect, wherein the case is fixed to a downward side of a vehicle floor, the base is provided with the battery connection portion and the load connection portion at a position facing to the vehicle floor, and the opening is provided at a front side distant from the vehicle floor across the base and the device mounting portion.

According to the first aspect of the present invention, the power distribution unit includes the base and the device mounting portion supported by the base and electrically connected to the base to distribute power from the battery to the load, and the base includes the battery connection portion for connection with the battery, and the load connection portion for connection with the load. Consequently, during the vehicle inspection, by disconnecting the electrical and mechanical connection between the base and the device mounting portion, the device mounting portion can be removed for repair or exchange (hereinafter referred to as the maintenance). That is, even if the battery connection portion and the load connection portion are located at a location that is difficult of access, the device mounting portion can be removed without accessing the battery connection portion and the load connection portion, thereby improving efficiency of operation in the maintenance.

DETAILED DESCRIPTION OF THE EXEMPLARY EMBODIMENTS

First Embodiment

Figure 1:
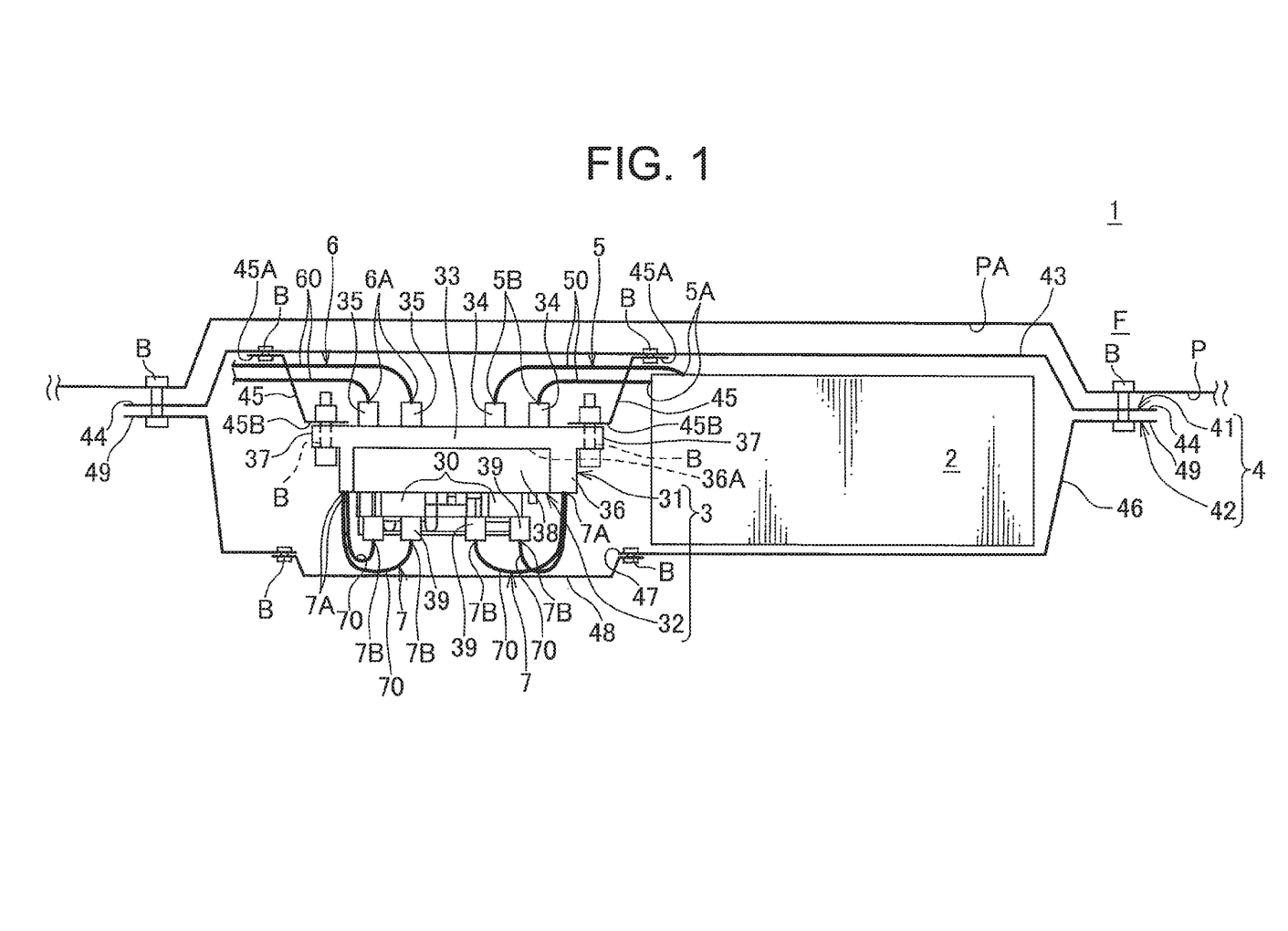
FIG. 1 schematically illustrates a battery module according to a first embodiment of the present invention.

In the following, a first embodiment of the present invention will be explained with reference to the drawings. FIG.

1 schematically illustrates a battery module 1 according to a first embodiment of the present invention. The battery module 1 is configured to be attached to a lower face of a vehicle body panel P constituting a vehicle floor F to distribute power to a plurality of loads (not shown) mounted on a vehicle.

As shown in FIG. 1, the battery module 1 includes a battery 2, a power distribution unit 3 configured to distribute power to the plurality of loads mounted on the vehicle, and a case 4 housing the battery 2 and the power distribution unit 3. The battery module 1 further includes a first wiring member 5 connecting the battery 2 and the power distribution unit 3, a second wiring member 6 connecting the power distribution unit 3 and each load, a third wiring member 7 connecting a later-described base of the power distribution unit 3 and a device mounting portion 32. The first wiring member 5, the second wiring member 6 and the third wiring member 7 include electric wires 50, 60 and 70 (conductive members), respectively, and are connected via connector connection to a mating battery connection portion 34, a mating load connection portion 35 and a mating connector connection portion 39, respectively. In this embodiment, although the first wiring member 5, the second wiring member 6 and the third wiring member 7 includes the electric wires 50, 60 and 70, respectively, a conductive member such as a bus bar may be used in place of the electric wire.

The battery 2 and the power distribution unit 3 are arranged side by side along the lower face of the vehicle body panel P. In this embodiment, a direction in which the battery 2 and the power distribution unit 3 are arranged side by side may be referred to as "right-left direction", a direction in which the battery 2 and the power distribution unit 3 are located with respect to the vehicle floor F may be referred to as "downward" and an opposite direction may be referred to as "upward". Further, a direction orthogonal to both of the right-left direction and the up-down direction may be referred to as "anterior-posterior direction".

Figure 2:
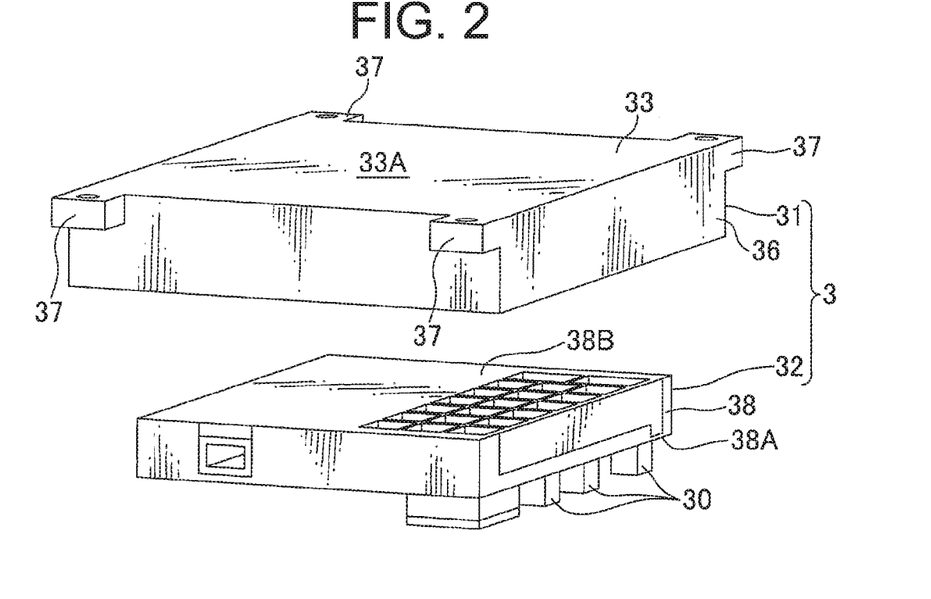
FIG. 2 is a perspective view showing a base and a device mounting portion constituting the battery module.

As shown in FIGS. 1 and 2, the power distribution unit 3 includes a base 31 and the device mounting portion 32 supported by the base 31 and configured to distribute power from the battery 2 to each load.

Figure 3:
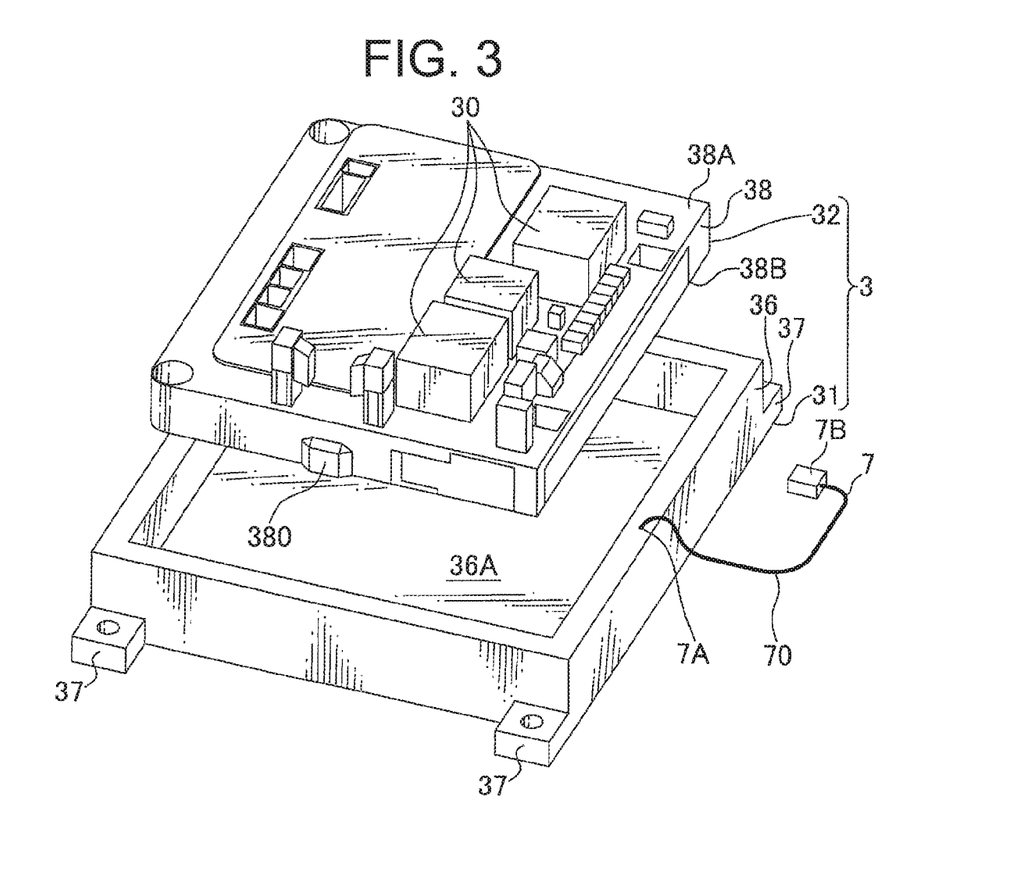
FIG. 3 is a perspective view of the base and the device mounting portion shown in FIG. 2 viewed from another angle.

As shown in FIGS. 1 and 3, the base 31 includes a plate-like base body 33, a plurality of battery connection portions 34 (in the shown example, two, shown in FIG. 1) and a plurality of load connection portions 35 (in the shown example, two, shown in FIG. 1) that are provided on a flat face 33A of the base body 33 facing upward (i.e., a face on the vehicle body panel P side), and a support portion 36 formed into a frame-like shape and extending downward from the base body 33 to house and support the device mounting portion 32 therein. With respect to the base body 33, a face surrounded by the support portion 36 may be referred to as an installation face 36A (installation portion). With the device mounting portion 32 being supported by the support portion 36, the installation face 36A is arranged to face to a face 38B of the device mounting portion 32 that is located opposite of a mounting face 38A of the device mounting portion 32, and can contact with the face 38B. That is, the device mounting portion 32 is arranged detachable with respect to the installation face 36A of the base 31. In FIG. 2, the battery connection portions 34 and the load connection portions 35 are omitted.

In this embodiment, the base body 33 is provided to and faces to a lower portion of the vehicle body panel P via the case 4. That is, the base body 33 is provided so as to extend in a direction orthogonal to the up-down direction. Further, the base body 33 is provided with base extending pieces 37 at its four corners, which are configured to be overlapped with and fastened by a bolt to later-described case fixing pieces 45 of the case 4. The base extending pieces 37 are formed to extend in the right-left direction from the four corners of the base body 33. With each base extending piece 37 being overlapped with and fastened by a bolt to the later-described case fixing piece 45 (shown in FIG. 1) of the case 4, the base body 33 is fixed to the case 4.

As shown in FIG. 1, of the two battery connection portions and the two load connection portions 35, the two battery connection portions 34 are provided at an end of the base body 33 on the battery 2 side (i.e., right side), and the remaining two load connection portions 35 are provided at an end of the base body 33 on the side apart from the battery 2 (i.e., left side). Each battery connection portion 34 is connected via connector connection to a second end 5B of the first wiring member 5 having a first end 5A connected to the battery 2. As such, the battery 2 and the base 31 are electrically connected to each other. Each load connection portion 35 is connected via connector connection to a second end 6A of the second wiring member 6 having a first end connected to each load. As such, each load and the base 31 are electrically connected to each other.

An inner face of the support portion 36 is provided with engagement receive portions (not shown) formed into a frame-like shape and capable of engaging to an engagement portion 380 of the device mounting portion 32. The engagement receive portions are provided in a pair and are formed as recesses arranged on each of inner faces of the support portion 36 opposing in the right-left direction.

As shown in FIG. 3, the device mounting portion 32 includes electric components 30 such as a relay, a fuse, a ECU and such, and a plate-like mounting portion 38 on which these electric components 30 are mounted.

The mounting portion 38 includes the mounting face 38A on which the electric components 30 are mounted. In this embodiment, the mounting portion 38 is installed such that the mounting face 38A faces downward (i.e., away from the vehicle body panel P). Further, the mounting face 38A is provided with the plurality of connector connection portions 39 (shown in FIG. 1). Each connector connection portion 39 is connected via connector connection to a second end 7B of the third wiring member 7 having a first end 7A connected to the base 31. As such, the base 31 and the device mounting portion 32 are electrically connected to each other.

The base 31 of the power distribution unit 3 is provided with a first connection path (not shown) formed by a conductive member such as a bus bar to electrically connect each battery connection portion 34 with the first end 7A of the third wiring member 8, and a second connection path (not shown) formed by a conductive member such as a bus bar to electrically connect the mounting portion 38 with each load connection portion 35. As such, the power supplied from the battery 2 via the first wiring member 5 is delivered sequentially through the battery connection portion 34, the first connection path of the base 31, the third wiring member 7, the device mounting portion 32, the second connection path of the base 31 and the load connection portion 35, and supplied to each load via the second wiring member 6.

As shown in FIG. 1, the case 4 includes an upper case 41 and a lower case 42. The upper case 41 includes a box-like upper case body 43 opened downward, and a pair of upper extending portions 44, 44 extending in the right-left direction from a lower end of the upper case body 43. The case 4 further includes the case fixing piece 45 for fixing the base 31 to the upper case 41. The case fixing piece 45 has a first end 45A overlapped with an inner face of the upper case body 43 and fixed thereto using a bolt B, and a second end 45B overlapped with the base extending piece 37 provided to the base 31 and fixed thereto using a bolt B. As such, the base 31 is fixed to the upper case 41. In this embodiment, although the base 31 is fixed to the base 4 with a bolt using the case fixing piece 45, the base 31 may be fixed to the case 4 using a known fixing method such as welding.

The lower case 42 includes a box-like lower case body 46 opened downward, an opening 47 providing access to inside the upper case body 43 and the lower case body 46, an access cover 48 covering the opening 47, and a pair of lower extending portions 49, 49 extending in the right-left direction from an upper end of the lower case body 46. In this embodiment, the opening 47 opens at a lower portion (at a side away from the vehicle body panel P) of the lower case body 46, and is sized to allow an entire of the mounting face 38A of the device mounting portion 32 to be exposed.

The access cover 48 is sized to cover the opening 47. The access cover 48 is fixed to a perimeter of the opening 47 with a bolt B and thereby attached to the lower case body 46. For example, a waterproof member such as a packing (not shown) is disposed between the access cover 48 and the perimeter of the opening 47, thereby ensuring sealing property.

The case 4 is fixed with a bolt B to a perimeter of a recessed portion PA formed on the vehicle body panel P such that the pair of upper extending portions 44, 44 and the pair of lower extending portions 49, 49 are overlapped in the up-down direction and are fastened together to the perimeter of the recessed portion PA. At this time, the upper case body 43 is accommodated within the recessed portion PA (shown in FIG. 1) formed on the vehicle body panel P. In this embodiment, although the case 4 is fixed to the vehicle body panel P using the bolt B, it may be fixed using a known fixing method such as welding.

Next, an assembling procedure of the battery module 1 will be explained.

Firstly, the first ends 5A of the first wiring member 5 are electrically connected to the battery 2, and the second ends 5B side of the first wiring member 5 is pulled out to the base 31 side (i.e., to the right side), and then the battery 2 is fixed to the case 4 using a known fixing method. Each of the first ends of the second wiring member 6 is electrically connected to each load, and each second end 6A side is pulled out to the base 31 side (i.e., to the left side). Further, the electric components 30 are mounted to appropriate locations on the mounting portion 38. Further, the access cover 48 is fixed to the perimeter of the opening 47 using a bolt.

The second ends 5B of the first wiring member 5 are connected via connector connection to the battery connection portion 34 located on the upper face 33A of the base 31, and the second ends 6A of the second wiring member 6 are connected via connector connection to the load connection portion 35. As such, the battery 2 and the base 31 are electrically connected, and the base 31 and each load are electrically connected. Then, with the upper face 33A of the base 31 oriented to face the upper case body 43, the second end 45B of the case fixing piece 45 with the first end thereof fixed to the upper case body 43 using a bolt, is fixed to the base extending piece 37 using a bolt. As such, the base 31 is fixed to the upper case body 43. During this time, the second ends 7B of the third wiring member 7 with the first ends 7A thereof connected to the base 31, are being pulled out to the support portion 36 side of the base 31. After that, the mounting portion 38 side of the device mounting portion 32 is brought close to and inserted to the support portion 36.

The engagement portion 380 of the mounting portion 38 is engaged to the engagement receive portion of the support portion 36. As such, the device mounting portion 32 is attached to the base 31. Then, the second end 7B of the third wiring member 7 is connected via connector connection to the connector connection portion 39. The pair of lower extending portions 49, 49 of the lower case 42 is overlapped with the pair of upper extending portions 44, 44 of the upper case 41, and the pair of lower extending portions 49, 49 and the pair of upper extending portions 44, 44 are fixed together to the perimeter of the recessed portion PA formed on the vehicle body panel P. As such, the battery module 1 is assembled. The opening 47 and the access cover 48 of the battery module 1 are provided at the downward side (front side) distant from the vehicle body panel P such that the base 31 and the device mounting portion 32 are located between the opening 47 and the access cover 48, and the vehicle body panel P.

During the vehicle inspection, to remove the device mounting portion 32 to repair or exchange the entire of the device mounting portion 32 or the electric component 30 as a part of the device mounting portion 32 (hereinafter referred to as the maintenance), the access cover 48 is removed and the device mounting portion 32 is exposed. The connector connection between the second end 7B of the third wiring member 7 and the connector connection portion 39 is disconnected, and then the engagement between the base 31 and the device mounting portion 32 is disengaged, and the device mounting portion 32 is removed from the base 31 and taken out from the opening 47. After that, the entire of the device mounting portion 32 is exchanged, or a part thereof is repaired, and then the device mounting portion 32 is again electrically and mechanically connected to the base 31 according to the reverse procedure. That is, the mounting portion 38 of the device mounting portion 32 is inserted into the case 4 through the opening 47 and brought close to and inserted to the support portion 36. The engagement portion 380 of the device mounting portion 32 is engaged to the engagement receive portion of the support portion 36. As such, the device mounting portion 32 is mechanically connected to the base 31. After that, the second end 7B of the third wiring member 7 is connected via connector connection to the connector connection portion 39. As such, the device mounting portion 32 is electrically connected to the base 31. Then, the access cover 48 is brought close to the opening 47 and fixed thereto using a bolt. In this manner, the maintenance is completed.

According to the embodiment described above, the base 31 is provided with the battery connection portions 34 and the load connection portions 35 at a location facing to the vehicle body panel P constituting the vehicle floor F, and the opening 47 is provided on the front side (downward side) distant from the vehicle body panel P such that the base 31 and the device mounting portion 32 are located between the vehicle body panel P and the opening 47. For example, in case of the battery module 1 being fixed to the lower face of the vehicle body panel P, the vehicle can be lifted by a lift and such and an operator works in a position facing upward. In this case, since the opening 47 is positioned at a location easy for the operator to gain access thereto, and since the opening 47 allows the device mounting portion 32 to be exposed, the efficiency of operation in the maintenance of the device mounting portion 32 can be improved.

Furthermore, since the base 31 is provided with the battery connection portions 34 and the load connection portions 35, the maintenance can be performed on the device mounting portion 32 by disconnecting only the connection between the base 31 and the device mounting portion 32. That is, even if the battery connection portions 34 and the load connection portions 35 are provided at a location that is difficult of access, the device mounting portion 32 can be removed without accessing to the battery connection portions 34 and the load connection portions 35, thereby improving the efficiency of operation in the maintenance of the device mounting portion 32.

Furthermore, the base 31 is provided with the installation face 36A on which the device mounting portion 32 is installed, and the device mounting portion 32 is provided with the connector connection portions 39 to which the electric wires 70 extending from the base 31 are connected, and the connector connection portions 39 are provided on the front side (downward side) distant from the installation face 36A on which the device mounting portion 32 is installed. As such, since the connector connection portions 39 are positioned at a location easy for the operator to access, the operation to electrically connect or disconnect the base 31 with the device mounting portion 32 during the maintenance of the device mounting portion 32 is made easier, thereby further improving the efficiency of operation in the maintenance of the device mounting portion 32.

Furthermore, the base 31 is provided with the installation face 36A on which the device mounting portion 32 is installed, and the battery connection portions 34 and the load connection portions 35 are provided at the back side distant from the device mounting portion 32 such that the installation face 36A is located between the battery connection portions 34 and the load connection portions 35, and the device mounting portion 32. Since the battery connection portions 34 and the load connection portions 35 are provided at the back side of the device mounting portion 32 such that the installation face 36A is located between the battery connection portions 34 and the load connection portions 35, and the device mounting portion 32, the operation to disconnect or re-connect the base 31 with the device mounting portion 32 can be performed without being hindered by the battery connection portions 34 and the load connection portions 35 and/or by the wiring members 5, 6 connected thereto.

Furthermore, the case 4 which houses the battery 2 and the power distribution unit 3 is provided, and the case 4 is provided with the opening 47 for exposing the device mounting portion 32 and the access cover 48 covering this opening 47. Consequently, the device mounting portion 32 can be exposed by removing the access cover 48, thereby further improving the efficiency of operation in the maintenance of the device mounting portion 32 while providing waterproof property for the battery 2 and the power distribution unit 3.

Figure 4:
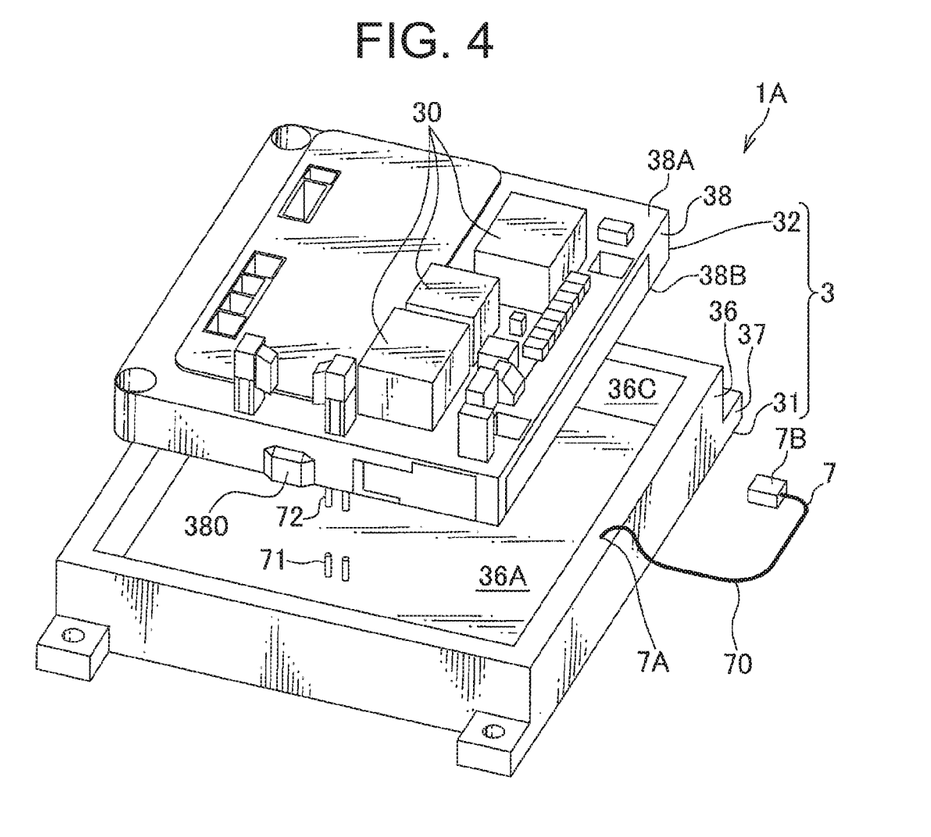
FIG. 4 is a perspective view schematically showing a modified example of the battery module shown in FIG. 1.

In the first embodiment described above, the third wiring member 7 connecting the base 31 of the power distribution unit 3 and the device mounting portion 32 is provided. By connecting the first end 7A of the third wiring member 7 to the base 31, and by fitting the second end 7B to the connector connection portion 39 of the device mounting portion 32, the base 31 and the device mounting portion 32 are electrically connected to each other. However, the present invention is not limited to this. In place of the third wiring member 7, a pair of connection portions 71, 72 for connecting via connector connection the base 31 and the device mounting portion 32 may be provided, as shown in FIG. 4. One connection portion 71 of the pair of connection portions 71, 72 may be provided to the installation face 36A (installation portion) of the base 31, and another connection portion 72 of the pair of connection portions 71, 72 may be provided to the face 38B of the mounting portion 38 opposite of the mounting face 38A.

Alternatively, one connection portion 71 of the pair of connection portions 71, 72 may be provided to an inner face 36C (installation portion) of the support portion 36 of the base 31, and another connection portion 72 of the pair of connection portions 71, 72 may be provided to an end face located between the mounting face 38A of the mounting portion 38 and the face 38B opposite of the mounting face 38A. Then, when the device mounting portion 32 is installed on the installation face 36A and the base 31 is attached to the device mounting portion 32, the pair of connection portions 71, 72 may be fitted to each other, thereby electrically connecting the base 31 and the device mounting portion 32. In this case, the base 31 is provided with each battery connection portion 34 and a third connection path (not shown) that is electrically connected to the one connection portion 71 of the pair of connection portions 71, 72 and that is formed of a conductive member such as a bus bar. As such, the power supplied from the battery 2 via the first wiring member 5 is delivered sequentially through the battery connection portion 34, the third connection path of the base 31, the pair of connection portions 71, 72 and the mounting portion 38, and through the electric component 30, and then delivered sequentially through the second connection path of the base 31 and the load connection portion 35, and supplied to each load via the second wiring member 6.

As described above, the pair of connection portions 71, 72 for connecting via connector connection the base 31 and the device mounting portion 32 is provided, and the base 31 is provided with the installation face 36A (or the inner face 36C) as the installation portion on which the device mounting portion 32. Further, the installation face 36A (or the inner face 36C) is provide with one of the pair of the connection portions 71, 72, and the another one of the pair of the connection portions 71, 72 is provided to the device mounting portion 32 and positioned so as to be fitted to the one of the pair of the connection portions 71, 72 when the device mounting portion 32 is installed on the installation face 36A. That is, with the device mounting portion installed on the installation face 36A and the pair of connection portions 71, 72 fitted to each other, the base 31 and the device mounting portion 32 are connected via connector connection. Consequently, an operation process for electrically connecting the base 31 and the device mounting portion 32 can be omitted.

Figure 5:
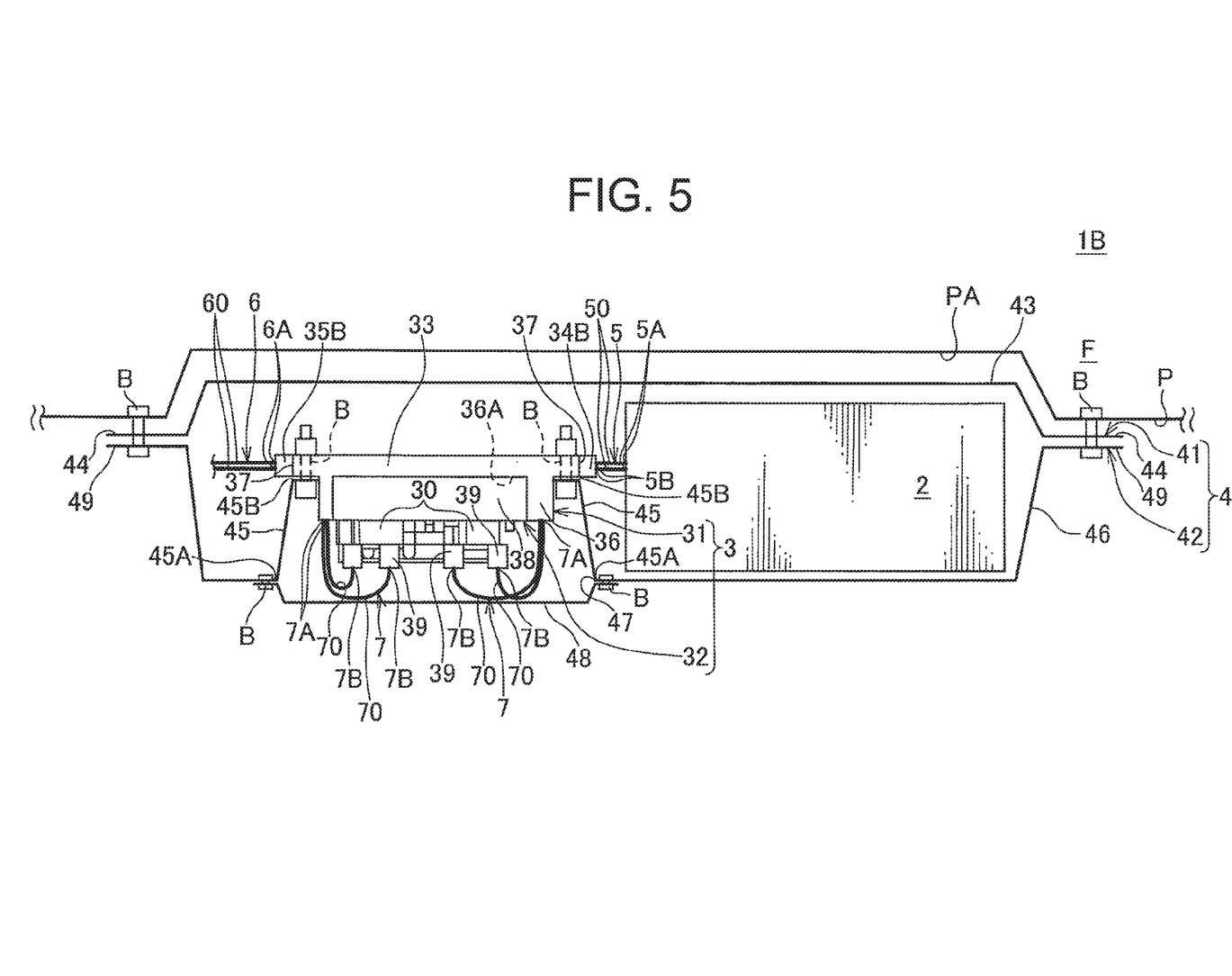
FIG. 5 is a diagram schematically showing another modified example of the battery module shown in FIG. 1.

Furthermore, in the first embodiment described above, the battery connection portions 34 and the load connection portions 35 are provided on the upper face 33A of the base body 33, and each second end 5B, 6A of the first wiring member 5 and the second wiring member 6 are brought close to and fitted to the battery connection portions 34 and the load connection portions 35 from above. However, the present invention is not limited to this. As shown in FIG. 5, in a battery module 1B, a battery connection 34B may be provided to a first end face of the base body 33 on the battery 2 side, and the second end 5B of the first wiring member 5 may be brought close to and fitted to the battery connection portion 34B from the right side (horizontal side), while the load connection portion 35B may be provided to a second end face of the base body 33 located opposite of the first end face on the battery 2 side, and the second end 6A of the second wiring member 6 may be brought close to and fitted to the load connection portion 35B from the left side (horizontal side). In this case, the base fixing piece 45 may have the first end 45A overlapped with and fixed using a bolt to the inner face of the lower case body 46, and the second end 45B overlapped with and fixed using a bolt to the base extending piece 37 provided to the base 31. FIG. 5 schematically shows the battery module 1B according to another modified example of the first embodiment of the present invention. In FIG. 5, elements having the same functions or the same constitution as the first embodiment are denoted by the same reference sign to omit detailed explanation thereof. This modified example has the similar advantageous effect with the embodiment described above.

Furthermore, in the first embodiment described above, the battery module 1, 1B is attached to the lower face of the vehicle body panel P constituting the vehicle floor F. However, the present invention is not limited to this. The battery module may be attached to any appropriate place on the vehicle body panel, for example, it may be attached at the vehicle body panel that is arranged substantially vertically.

Second Embodiment

Figure 6:
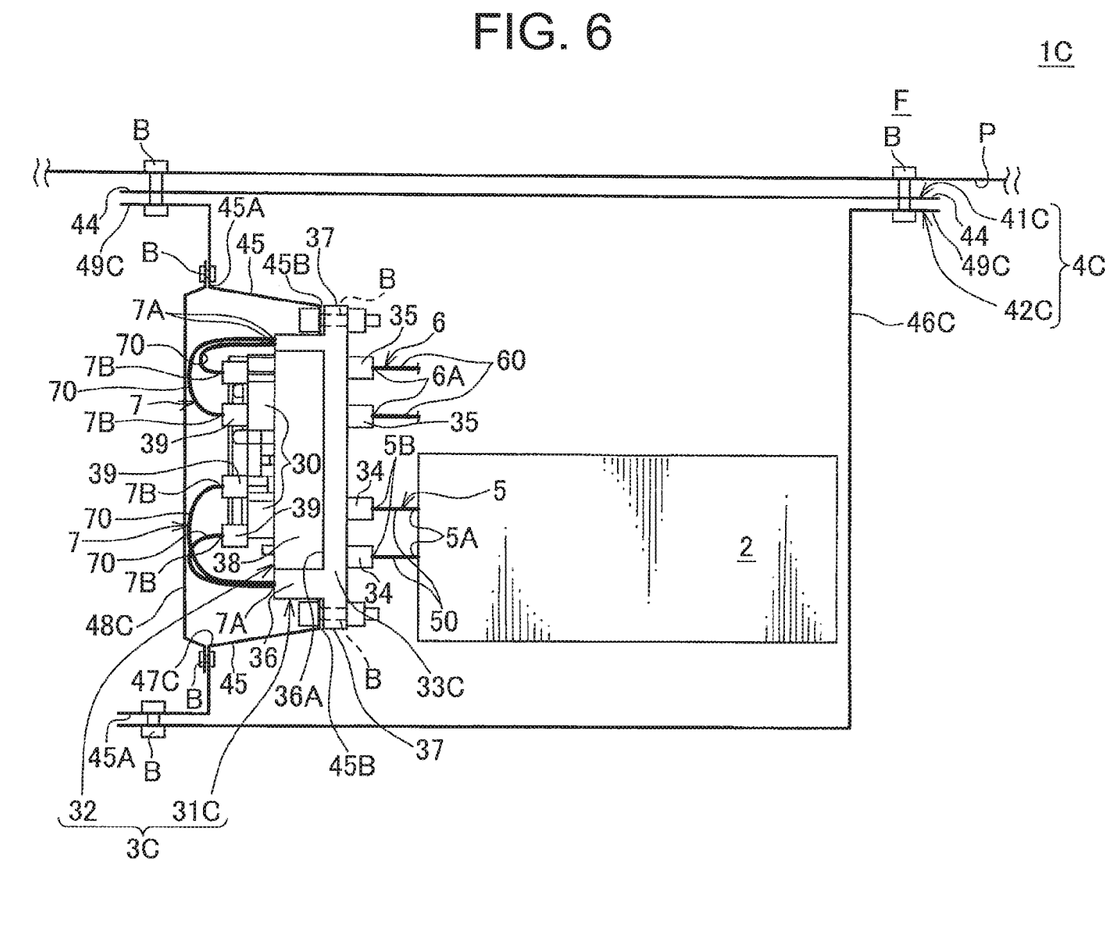
FIG. 6 is a diagram schematically showing a battery module according to a second embodiment of the present invention.

Next, a battery module 1C according to a second embodiment of the present invention will be explained with reference to the drawings. FIG. 6 is a diagram schematically showing the battery module 1C according to the second embodiment of the present invention. In FIG. 6, elements having the same functions or the same constitution as the first embodiment are denoted by the same reference sign to omit detailed explanation thereof. The battery module 1C is configured to be attached to a lower face of a vehicle body panel P constituting a vehicle floor F to distribute power to a plurality of loads (not shown) mounted on a vehicle. Difference between the battery module 1C of the second embodiment and the battery module 1 of the first embodiment exists in the arrangement of a power distribution unit 3, 3C with respect to a battery 2.

As shown in FIG. 6, the battery module 1C includes the battery 2, a power distribution unit 3C configured to distribute power to the plurality of loads mounted on the vehicle, and a case 4C housing the battery 2 and the power distribution unit 3C.

As shown in FIG. 6, the power distribution unit 3C includes a base 31C and a device mounting portion 32 supported by the base 31C and configured to distribute power from the battery 2 to each load.

the base 31C includes a plate-like base body 33C, a plurality of battery connection portions 34 (four, in the shown example) and a plurality of load connection portions 35 that are provided on a flat face 33A of the base body 33C, and a support portion 36 formed into a frame-like shape and extending in a direction away from the flat face 33A from the base body 33C to house and support the device mounting portion 32 therein. In the battery module 1C of this embodiment, the flat face 33A of the base body 33C is arranged to face a side face of the battery 2, and the support portion 36 is extending in a direction away from the battery 2 such that the base body 33C is located between the support portion 36 and the battery 2.

The case 4C includes an upper case 41C and a lower case 42C. The lower case 42C includes a box-like lower case body 46C opened upward, an opening 47C allowing access to inside the case 4C, an access cover 48C covering the opening 47C, and a pair of lower extending portions 49C, 49C extending in the right-left direction from an upper end of the lower case body 46C. In this embodiment, the opening 47C is opened to the side of the lower case body 46C (i.e., a direction along the vehicle body panel P and away from the battery 2).

During the vehicle inspection, for example, in the case where the battery module 1C is fixed to the lower face of the vehicle body panel P, the vehicle can be lifted by a lift and such and an operator works in a position facing upward. In this case, since the opening 47C is opened in the direction away from the battery 2 (i.e., in the right-left direction), the operator does not need to work with his hands lifted. Thus, as in the first embodiment, physical load on the operator can be reduced compared to the case of the operation requiring the operator to work with his hands lifted. Consequently, the similar advantageous effect as the above-described embodiment can be obtained, that is, the efficiency of operation can be improved during the maintenance of the device mounting portion 32.

Preferred constitution and method and such to implement the present invention have been disclosed herein. However, the present invention is not limited to these. That is, although the present invention has been illustrated and shown mainly with respect to a certain embodiment, it will be apparent to a skilled person in the art that various changes can be made to the embodiments described above regarding shape, material, number and other detailed constitution without departing from the spirit and object of the present invention. Description that may limit the shape, material and such disclosed herein is described for the illustrative purpose only to enhance understanding of the present invention, and thus is not intended to limit the present invention. Therefore, description using name of a member without those limitations, either entire limitation or a part of limitation, regarding the shape, material and such, is also within the present invention.

LIST OF REFERENCE SIGNS 1, 1A, 1B, 1C battery module
2 battery
3, 3C power distribution unit
4, 4C case
31, 31C base
32 device mounting portion
34, 34B battery connection portion
35, 35B load connection portion
36A installation face (installation portion)
36C inner face (installation portion)
39 connector connection portion
47, 47C opening
48, 48C cover (access cover)
70 electric wire (conductive member)
71, 72 pair of connection portions
F vehicle floor

What is claimed is:

1. A battery module comprising:
   a battery; and
   a power distribution unit connected to the battery and configured to distribute power to a load, wherein
   the power distribution unit includes a base and a device mounting portion supported by the base and electrically connected to the base to distribute power from the battery to the load, and
   the base includes a battery connection portion for connection with the battery, and a load connection portion for connection with the load.

2. The battery module according to claim 1, wherein
   the base includes an installation portion on which the device mounting portion is installed, the device mounting portion is provided with a connector connection portion to which a conductive member extending from the base is connected, and the connector connection portion is provided at a front side of the device mounting portion that is located away from the installation portion.

3. The battery module according to claim 2, wherein the base includes an installation portion on which the device mounting portion is installed, and the battery connection portion and the load connection portion are provided at a back side distant from the device mounting portion across the installation portion.

4. The battery module according to claim 2, further comprising a case housing the battery and the power distribution unit, wherein the case includes an opening configured to allow the device mounting to be exposed, and a cover covering the opening.

5. The battery module according to claim 4, wherein the case is fixed to a downward side of a vehicle floor, the base is provided with the battery connection portion and the load connection portion at a position facing to the vehicle floor, and the opening is provided at a front side distant from the vehicle floor across the base and the device mounting portion.

6. The battery module according to claim 1, further comprising a pair of connection portions configured to connect via connector connection the base with the device mounting portion, wherein the base includes an installation portion on which the device mounting portion is installed, the installation portion includes one of the pair of the connection portions, and another one of the pair of the connection portions is provided to the device mounting portion and positioned so as to be fitted to the one of the pair of connection portions when the device mounting portion is installed to the installation portion.

7. The battery module according to claim 6, wherein the base includes an installation portion on which the device mounting portion is installed, and the battery connection portion and the load connection portion are provided at a back side distant from the device mounting portion across the installation portion.

8. The battery module according to claim 6, further comprising a case housing the battery and the power distribution unit, wherein the case includes an opening configured to allow the device mounting to be exposed, and a cover covering the opening.

9. The battery module according to claim 8, wherein the case is fixed to a downward side of a vehicle floor, the base is provided with the battery connection portion and the load connection portion at a position facing to the vehicle floor, and the opening is provided at a front side distant from the vehicle floor across the base and the device mounting portion.

10. The battery module according to claim 1, wherein the base includes an installation portion on which the device mounting portion is installed, and the battery connection portion and the load connection portion are provided at a back side distant from the device mounting portion across the installation portion.

11. The battery module according to claim 10, further comprising a case housing the battery and the power distribution unit, wherein the case includes an opening configured to allow the device mounting to be exposed, and a cover covering the opening.

12. The battery module according to claim 11, wherein the case is fixed to a downward side of a vehicle floor, the base is provided with the battery connection portion and the load connection portion at a position facing to the vehicle floor, and the opening is provided at a front side distant from the vehicle floor across the base and the device mounting portion.

13. The battery module according to claim 1, further comprising a case housing the battery and the power distribution unit, wherein the case includes an opening configured to allow the device mounting to be exposed, and a cover covering the opening.

14. The battery module according to claim 13, wherein the case is fixed to a downward side of a vehicle floor, the base is provided with the battery connection portion and the load connection portion at a position facing to the vehicle floor, and the opening is provided at a front side distant from the vehicle floor across the base and the device mounting portion.

\* \* \* \* \*